United States Patent Office 3,232,015
Patented Feb. 1, 1966

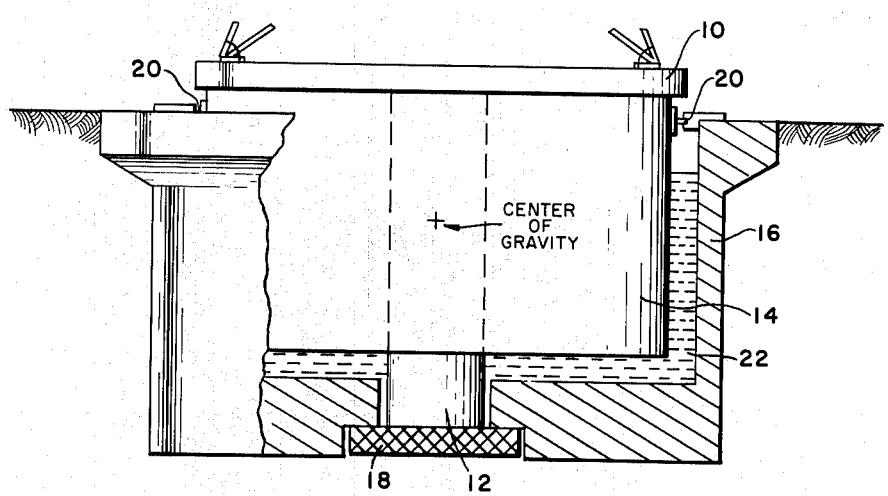

3,232,015
SHOCK ISOLATING SUPPORT SYSTEMS
Willie O. Latham, Essex, Mass., assignor to Sylvania Electric Products Inc., a corporation of Delaware
Filed Mar. 15, 1962, Ser. No. 179,848
5 Claims. (Cl. 52—167)

The present invention relates generally to support systems and more particularly to shock isolating hydrostatic support systems.

Because of the extreme size and weight of large radar antennas of the type used for radio astronomy and satellite tracking, bearing systems of conventional design are uneconomical in such applications due to the difficulty and expense of fabricating large, heavy-load bearings. Another disadvantage is that the bearings must sustain the entire system weight at all times.

The requirement of constantly sustaining the system weight can be satisfactorily met under normal conditions, but if the structure is to withstand additional forces, as would be encountered in the event of a bomb blast, the bearing system becomes unwieldingly large and expensive. This is particularly true in installations requiring rotation of the radar antenna about a vertical axis, since in this case a roller or ball bearing of very large size would be necessary.

With an appreciation of the foregoing limitations, applicant has provided a support system for a radar antenna or the like which includes a buoyant body partially submerged in a liquid whereby an upward force is applied to the support structure which will oppose a downward force resulting from an overhead shock, thereby cancelling or reducing the effect of the overhead shock on the supported structure.

It is therefore a primary object of the present invention to provide a support system which will isolate a structure from the effects of an overhead shock.

Another object of the invention is to eliminate the necessity of heavy-load bearings to support heavy structures.

Another object of the invention is to counteract the weight of a structure with a force applied in opposition to the force caused by the structure weight.

Still another object of the invention is to apply a force to a structure which will oppose a force caused by a shock.

A further object of the invention is to provide a support system which will become unloaded when an overpressure occurs.

It is well known from the principle of Archimedes that when a body is floating at rest in a liquid, the buoyant force acting upward is equal to the weight of the body acting downward. If a floating body is held below its normal rest position, the buoyant force now produced is the sum of the buoyant force when the body is at rest plus an additional buoyant force which is proportional to the distance the body is submerged below its rest level. The resultant buoyant force is greater than the weight of the body and acts in an upward direction. It will be appreciated, then, that this upward force, which will be called the prestressing force, will prestress the buoyant body and its associated structure.

To submerge the body further into the liquid a downward force greater than the prestressing force would have to be applied; consequently, if the initial prestressing force is equal to or greater than predicted overhead forces, the body would be isolated from all downward forces which were equal to or less than the prestressing force.

These principles are embodied in the present invention which, briefly, consists of a buoyant body, adapted to support a load, partially submerged in a liquid contained in a tank which, typically, is rigidly secured in the ground. A thrust bearing holds the buoyant body below its normal equilibrium level in the liquid, thereby causing an excess buoyant force to be applied to the body and its associated structure, which will oppose any additional downward force which might be applied to the structure.

The foregoing and other objects, features, and advantages of the present invention will become apparent from the following detailed description taken in conjunction with the accompanying drawing, the single figure of which is an elevation cross-sectional view of one embodiment of the invention.

A shock isolating hydrostatic support structure in accordance with the invention is shown in the drawing, which is by way of example only, and finds particular application in the isolation of large rotatable structures, such as radar antennas, from the effects of an overhead bomb blast. The antenna structure partially shown at 10 is attached to and supported by cylindrical shaft 12 and buoyant body 14 which is partially submerged in liquid 22 contained in cylindrical tank 16. The lower end of shaft 12 is journalled in a thrust bearing 18, which, in turn, is secured to the bottom of the tank 16 which is normally buried in the ground to its own depth as shown. The requisite prestressing force is conveniently obtained by placing the body and shaft into the tank when empty, and after fitting the bearing to the shaft, adding liquid to the tank to a level at which there is the proper amount of excessive buoyant force. The proper level can be calculated, or determined while the tank is being filled by a strain gauge affixed to the shaft. The entire buoyant structure may be rotated by suitable means (not shown), and rollers 20 may be provided to maintain vertical alignment.

In a representative embodiment, the weight of the supported system consisting of antenna structure 10, buoyant body 14 and shaft 12 is approximately 250 tons. The tank 16 is forty feet in diameter and twenty-five feet deep and is rigidly supported in the ground. The tank is filled with water to a level of twenty feet, with the body 14 submerged to a depth of eighteen feet. The normal rest position of a load of this weight is at a depth of approximately seven feet, the additional eleven feet of submersion causing a prestressing force equal to the force expected from the shock of a bomb blast, estimated to be five pounds per square inch. This pressure on a structure of the indicated dimensions would cause a force of approximately 370 tons. The shaft being prestressed to an amount equal to or greater than the force of the shock, the shock will not cause any vertical motion of the supported structure since the force of the shock will be counteracted by the prestressing force. Even if the force of the shock is greater than the prestressing force, only the resulting difference between the prestressing force and the force of the shock would cause vertical motion to the structure.

Whereas the bearings in a conventional rotatable support system must support the entire system weight, the thrust bearing in the present invention need only withstand the prestressing force applied to the system, the weight of the supported structure being counteracted by the buoyant force. When an overpressure occurs, the force of a downward shock wave will unload thrust bearing 18, which is upwardly loaded by the prestressing force, while in conventional bearing support systems, a downward force caused by a shock wave would additionally load a downwardly loaded thrust bearing. For example, in the hydrostatic support structure shown in the figure, bearing 18 must sustain a load of 370 tons caused by the prestressing force but bearing 18 becomes unloaded when a shock occurs. If the same structure were supported in a conventional manner, however, the bearing would have to sustain the load caused by the system weight in addition to the force caused by an overpressure, which in the illustrated case would be 620 tons.

The present invention therefore provides a means of eliminating or reducing the effects of an overhead shock wave by opposing the force of the shock with an opposite force produced by the buoyancy of the support system.

While what has been described is a preferred embodiment of the invention, many modifications and changes can be made without departing from the spirit and scope of the present invention. For example, other liquids, such as oil, can be substituted for the water used in tank 16. The support system need not be rotatable, as a stationary support system would suffice for many applications. Accordingly, it is not intended to limit the scope of the present invention by what has been particularly described except as indicated in the appended claims.

What is claimed is:

1. A shock isolating hydrostatic support structure comprising a cylindrical tank rigidly supported in the ground and containing a liquid, a rotatable cylindrical buoyant member partially submerged in said liquid to a position below its normal equilibrium level, guide means secured around the periphery of said tank and arranged to maintain the vertical alignment of said buoyant member, a vertically disposed rotatable cylindrical shaft connected at its upper end to said buoyant member, a thrust bearing connected to the lower end of said shaft and operative in conjunction with the bottom of said tank to hold said shaft in tension and arranged to permit axial movement between said shaft and said tank when a downward force applied to said support structure exceeds the force of tension in said shaft.

2. A shock isolating hydrostatic support structure comprising, a tank containing a liquid, a buoyant body partially submerged in said liquid to a position below its normal equilibrium level, a shaft in tension connected at one end to said buoyant body and at the other end to the bottom of said tank, and means connected to the bottom of said tank for releasably engaging said shaft.

3. A shock isolating hydrostatic support structure comprising, a tank containing a liquid and having a floor including means for releasably engaging a shaft, a buoyant body partially submerged in said liquid to a position below its normal equilibrium level, a shaft connected at one end to said buoyant body and at the other end to said releasably engaging means whereby said shaft is held in tension.

4. A shock isolating hydrostatic support structure comprising, a tank containing a liquid, a buoyant body partially submerged in said liquid to a position below its normal equilibrium level, a shaft connected at one end to said buoyant body, means connected to the other end of said shaft for holding said shaft in tension and permitting axial movement between said shaft and said tank when a downward force applied to said support structure exceeds the tension force.

5. A shock isolating hydrostatic support structure comprising, a tank containing a liquid and having a bottom portion for securing a thrust bearing, a buoyant body partially submerged in said liquid to a level below its normal equilibrium level, a thrust bearing disposed on said bottom portion, a shaft connected at one end to said buoyant body and at the other end to said thrust bearing, said thrust bearing being operative in cooperation with said shaft and said tank to maintain said shaft in tension.

References Cited by the Examiner

UNITED STATES PATENTS

| | | | |
|---|---|---|---|
| 535,044 | 3/1895 | Anderson et al. | 52—168 XR |
| 909,540 | 3/1909 | Burns | 52—740 XR |
| 2,189,486 | 2/1940 | D'Amico | 52—126 |
| 2,583,911 | 1/1952 | Webster | 52—264 XR |
| 2,777,669 | 1/1957 | Willis et al. | 61—46.5 X |
| 2,889,795 | 6/1959 | Parks | 61—46.5 |
| 3,075,654 | 1/1963 | Wheeler | 52—204 XR |

FOREIGN PATENTS

| | | |
|---|---|---|
| 39,239 | 6/1887 | Germany. |
| 188,455 | 9/1907 | Germany. |
| 325,700 | 9/1920 | Germany. |
| 255,561 | 7/1926 | Great Britain. |

FRANK L. ABBOTT, *Primary Examiner.*

JACOB L. NACKENOFF, HENRY C. SUTHERLAND,
*Examiners.*